United States Patent [19]
Green

[11] Patent Number: 6,056,226
[45] Date of Patent: May 2, 2000

[54] CADDY FOR ELECTRIC EXTENSION CORDS

[76] Inventor: Robert L. Green, 18778 N. 93rd St., Scottsdale, Ariz. 85255

[21] Appl. No.: 09/232,592

[22] Filed: Jan. 19, 1999

[51] Int. Cl.[7] .............................. B65H 75/30; B65H 75/38
[52] U.S. Cl. .................. 242/395; 242/405.3; 191/12.2 R
[58] Field of Search .................................. 242/395, 395.1, 242/405.3, 405, 388.1; 191/12.2 R

[56] References Cited

U.S. PATENT DOCUMENTS

| | | | |
|---|---|---|---|
| 2,801,303 | 7/1957 | Pailing | 242/395.1 |
| 3,313,498 | 4/1967 | Wasson | 242/395.1 |
| 4,979,693 | 12/1990 | Eberhardt et al. | 242/395 |
| 5,915,641 | 6/1999 | Barberg | 242/395.1 |

*Primary Examiner*—John Q. Nguyen
*Attorney, Agent, or Firm*—Warren F. B. Lindsley; Frank J. McGue

[57] ABSTRACT

A caddy for storage and transportation of a heavy-duty electrical extension cord, the caddy comprising a reel mounted inside a protective container. A cord is wound on the reel for storage and subsequently unwound for use, the tendency for tangling and twisting characteristic of hand-coiled cords is avoided. Storage inside the container protects the cord against damage during transportation.

3 Claims, 1 Drawing Sheet

6,056,226

CADDY FOR ELECTRIC EXTENSION CORDS

BACKGROUND OF THE INVENTION

The storage and transporting of relatively long heavy-duty electrical extension cords presents a number of problems. Typically the cord is coiled by hand after use, then thrown in a heap or hung on a hook between periods of use. When it is subsequently uncoiled for use, it tends to twist and tangle so that its extension for use becomes a difficult and often a frustrating experience. The cord is especially subject to damage during storage and transportation from one work site to another.

The present invention relates to a caddy for transporting and storage of a heavy duty electrical extension cord mounted inside a container. The cord is taken up by a reel mounted inside a container as the reel is turned by means of a crank. The cord is subsequently unwound from the reel as it is withdrawn through an opening in the side of the container. The container has a handle which serves as a convenient means for carrying the container and the container protects the cord against damage and dirt during storage.

DESCRIPTION OF THE PRIOR ART

Various open-reel type devices are known for storage and transportation of electrical extension cords, but none are known in which the reel is mounted as claimed herein inside a protective container wherein a length of electrical cord at its input end is available for connection to a power outlet without completely unwinding the cord.

SUMMARY OF THE INVENTION

In accordance with the present invention, an electrical extension cord caddy comprising a reel mounted inside a protective container is provided wherein the cord is wound up on a reel as the reel is turned by use of a removable hand crank. The cord and reel are transported and stored inside the container until needed at which time the cord is at least partially withdrawn through an opening in the side of the container.

It is, therefore, one object of this invention to provide a new and improved caddy for a heavy-duty electrical extension cord.

Another object of this invention is to provide such a caddy in a form which incorporates a storage reel inside a protective container.

A further object of this invention is to provide such a caddy in a form which prevents the cord from becoming twisted and tangled during storage and during its extension for use.

A still further object of this invention is to provide such a caddy with a container that is designed to facilitate its being carried by one hand and at the same time affording effective protection of the cord during its storage and transport.

Yet another object of this invention is to provide such an electrical extension cord caddy in a form which permits the connection of its plug and its source end to an electrical outlet without completely unwinding the cord from the reel.

Further objects and advantages of the invention will become apparent as the following description proceeds and the features of novelty which characterize the invention will be pointed out with particularity in the claims annexed to and forming a part of this specification.

BRIEF DESCRIPTION OF THE DRAWING

The present invention may be more readily described by reference to the accompanying drawing, in which.

DESCRIPTION OF THE PREFERRED EMBODIMENT

Figure 1:
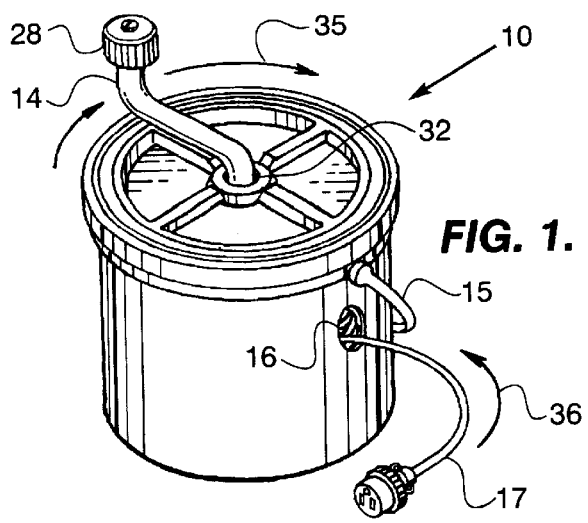
FIG. 1 is a perspective view of the electrical extension cord caddy of the invention with an extension cord stored inside, its end protruding through an opening in the side of the container.

Referring more particularly to the drawing by characters of reference, FIGS. 1–4 disclose an electrical extension cord caddy 10 of the invention, the caddy 10 comprising a container 11, a reel 12, a container cover 13, and a hand crank 14.

Container 11 has the form of a bucket, preferably cylindrically shaped, with a handle 15 mounted on one end of the container for carrying purposes. A circular opening 16 on one side of container 11 provides passage for the extension cord 17 during storage and withdrawal of the cord. In a first embodiment of the invention, a five gallon plastic bucket was employed for the container.

Figure 3:
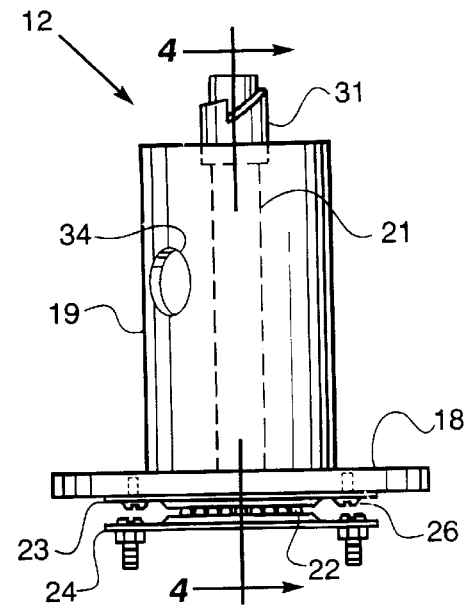
FIG. 3 is a side view of the reel upon which the electrical cord is wound for storage.
Figure 2:
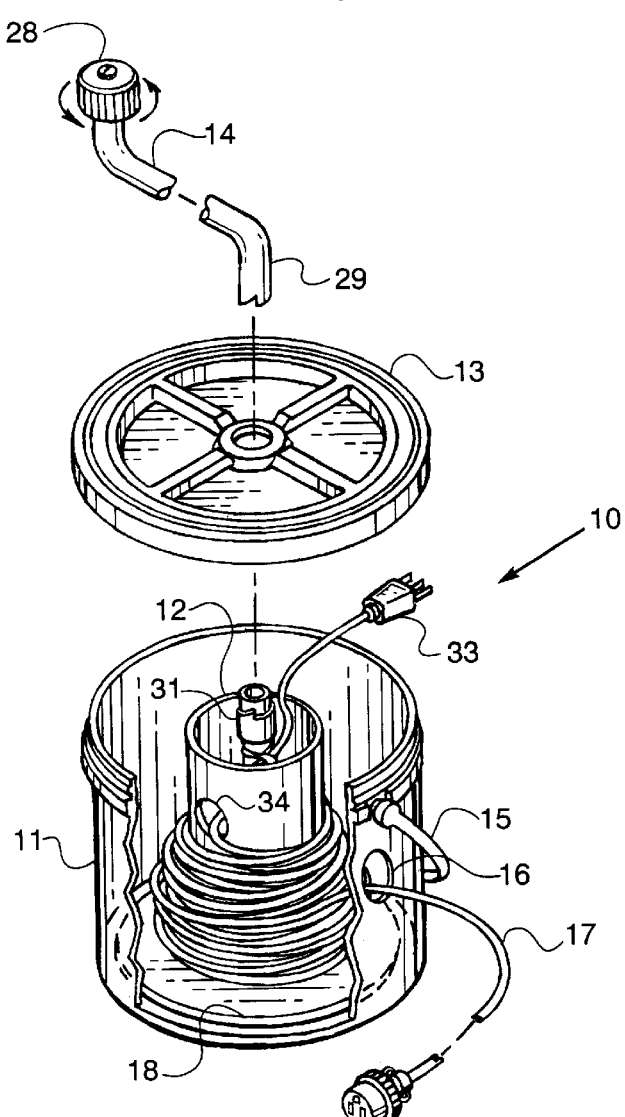
FIG. 2 is a partially exploded view of the cord caddy of FIG. 1 with the hand crank and container cover removed and with parts hidden inside the container shown by broken lines.
Figure 4:
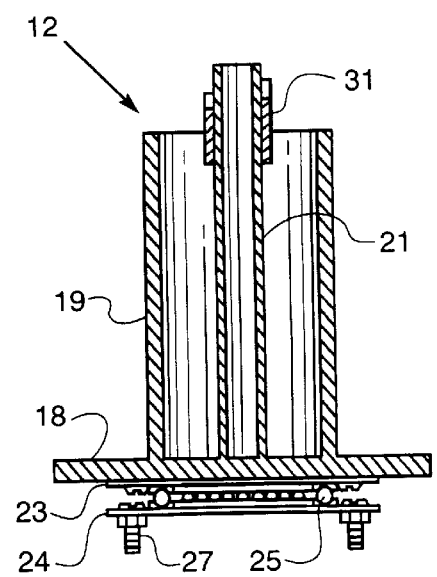
FIG. 4 is a cross-sectional view taken along line 4—4 of FIG. 3.

Reel 12, as shown in FIGS. 2, 3 and 4, comprises a circular base 18, a hollow cylindrical spool 19 having a diameter approximately one-third that of container 11 and a cylindrical shaft 21. The spool 19 and shaft 21 are concentric with the cylindrical form of container 11, both rising vertically from their centered positions upon the horizontally oriented circular base 18. As shown in FIGS. 3 and 4, spool 19 and shaft 21 are preferably made of plastic and integral with base 18, but the reel may be fabricated by cementing together lengths of commercially available plastic tubing and various plastic fittings.

Reel 12 is mounted inside container 11, as shown in FIG. 2, where it is rotatably secured to the bottom of container 11 by means of a Lazy Susan bearing 22.

Lazy Susan bearing 22 has an upper plate 23 and a lower plate 24 which are rotatably secured to each other with the aid of a circular trace of ball bearings 25 (see FIG. 4). The upper plate 23 is secured to the underside of base 18 of reel 12 by means of screws 26 and the lower plate 24 is secured by screws 27 and nuts (not shown) to the bottom of container 11. The reel 12 is thus free to rotate inside container 11.

Crank 14 has a rotatable knob 28 at its outer end and a quick-disconnect couple member 29 at the other end which mates with a second disconnect member 31 that is rigidly secured to the top of shaft 21.

Container cover 13 fits over the circular opening of container 11 and has a circular central opening through which the upper end of shaft 21 and disconnect member 31 pass when cover 13 is installed. As shown in FIG. 2, crank 14 must be removed prior to the removal of cover 13.

When the extension cord 17 is initially installed in caddy 10, its plug end 33 is passed through opening 16 of container 11 and through an opening 34 in the wall of reel 12 into the hollow space inside reel 12. A length of cord that is deemed long enough to reach the typical outlet location is drawn through opening 34 and is stored inside reel 12 by spiraling around shaft 21 and about the inside surface of reel 12. Cover 13 and hand crank 14 are then put in place as shown in FIG. 1. When this has been done, crank 14 is turned as indicated by arrow 35 causing the reel 12 to rotate, thereby taking up cord 17 as indicated by arrow 36. The entire cord is taken up in this manner except for a short length (three to six inches) which needs to be grasped when the cord is subsequently extended for use.

When the cord is to be extended for use the short end of cord 17 extending from the caddy is grasped and the desired length of cord is drawn from the caddy, the reel turning to unwind the cord as the cord is drawn from the caddy. When the cord is stored and withdrawn in the manner just described, there is no tendency for the cord to become twisted or tangled. After the desired length of cord has been withdrawn, crank 14 and cover 13 are removed and plug end 33 of the cord is removed from its storage space inside reel 12. The cord is then plugged into a power source and is ready for use.

Following such use, plug end 33 is again stowed inside reel 12, the cover 13 and crank 14 are installed, and crank 14 is operated to take up the cord as described earlier. The caddy may be conveniently carried to a storage shed or to a truck using the container handle 15.

Although but a single embodiment of the invention has been illustrated and described, it will be apparent to those skilled in the art that various changes and modifications may be made therein without departing from the spirit of the invention or from the scope of the appended claims.

What is claimed is:

1. A caddy for an electrical extension cord having a plug end and a receptacle end, said caddy comprising:

a protective container having the general form of a bucket having a cylindrical side and a horizontal circular base and a removable cover with a central opening therein, a reel, rotatably mounted inside said protective container, said reel comprising a hollow cylindrical spool and a concentric shaft in the hollow interior of said spool, both integral with and extending upwardly from the horizontal circular base of said container, a first opening in the cylindrical side of said container for passage of said extension cord, a second opening in said hollow cylindrical spool for passage of a portion of said extension cord, and a hand crank removably coupled to said shaft by means of a quick disconnect coupling means, the upper end of said shaft and said quick disconnect means passing through the central opening when said cover is in place upon said container whereby, when said extension cord is initially installed in said caddy the plug end is passed first through said first opening in said container, then through said second opening in said hollow spool, a short length of said plug end of said cord thus entering the hollow interior of said spool and being wound about said shaft and about the interior surface of said spool for storage, said hand crank and said cover being removed during the initial installation of said cord in said caddy while said short length of said plug end of said cord is being passed through said first opening in said container and through said second opening in said spool and while said short length of said plug end is being stored inside said spool, and said cover being installed atop said container during transport and storage of said caddy, said hand crank being adapted to rotate said reel within said container, causing all but a short length of said receptacle end of said cord to be taken up by said reel for storage about the outside surface of said spool, and when said cord is to be withdrawn for use, a length of said cord is withdrawn by grasping said short length of said receptacle end and pulling the cord, thereby causing said reel to rotate, unwinding said cord until the desired length has been extended, said short length of said plug end of said cord is then removed from inside said hollow spool and plugged into a power outlet.

2. The caddy as set forth in claim 1 wherein:

said reel is rotatably mounted inside said protective container by means of a Lazy Susan bearing.

3. The caddy as set forth in claim 1 wherein:

said container has a handle mounted thereon for carrying said caddy.

* * * * *